United States Patent [19]

Bristow et al.

[11] 3,999,468

[45] Dec. 28, 1976

[54] PISTON FOR HYDRAULIC TRANSLATING UNIT

[75] Inventors: Gavin C. Bristow, Joliet, Ill.; Clarence D. Husson, Jr., York, Pa.

[73] Assignee: Caterpillar Tractor Co., Peoria, Ill.

[22] Filed: July 7, 1975

[21] Appl. No.: 593,414

Related U.S. Application Data

[63] Continuation of Ser. No. 317,415, Dec. 21, 1972, abandoned.

[52] U.S. Cl. .................................... 92/248; 92/256

[51] Int. Cl.[2] ............................................ F16J 1/00

[58] Field of Search ............ 92/248, 249, 255, 256; 85/8.8; 137/515; 285/239, 291, 328

[56] References Cited

UNITED STATES PATENTS

| | | | |
|---|---|---|---|
| 1,167,975 | 1/1916 | Burlingham | 92/172 X |
| 2,846,015 | 8/1958 | Pittman | 137/515 X |
| 2,860,609 | 11/1958 | Roth | 92/256 X |
| 2,950,132 | 8/1960 | Kocsuta | 85/8.8 |
| 3,080,854 | 3/1963 | Wiggermann | 92/169 X |
| 3,469,494 | 9/1969 | Frailly | 85/8.8 |
| 3,633,467 | 1/1972 | Watanabe et al. | 92/248 |
| 3,707,113 | 12/1972 | Hein et al. | 92/248 |
| 3,741,077 | 6/1973 | Hulsebus et al. | 92/248 |
| 3,861,278 | 1/1975 | Forster | 92/255 X |

*Primary Examiner*—Irwin C. Cohen
*Attorney, Agent, or Firm*—Phillips, Moore, Weissenberger, Lempio & Strabala

[57] ABSTRACT

A piston, such as that used in an axial and/or radial piston hydraulic translating unit, comprising a hollow-skirt portion having inner surfaces defining a substantially conical cavity filled with a core of lightweight material, the material being retained in place by snap rings resiliently mounted into annular grooves formed on the inner surfaces of the skirt portion, which mechanically interlock the core material with the piston.

1 Claim, 5 Drawing Figures

PISTON FOR HYDRAULIC TRANSLATING UNIT

This is a continuation, of Ser. No. 317,415, filed Dec. 21, 1972 now abandoned.

BACKGROUND OF THE INVENTION

This invention relates to a reciprocating-piston type fluid translating device such as used for pumps or motors. More specifically, the invention relates to a light-weight-core piston of the type used in these units having an improved means for retaining the core against axial displacement during operating of the piston, and further having an improved core design to increase piston strength against the high stresses developed within the translating unit.

Conventionally, the weight of the pistons contained within these translating units is reduced by hollowing out the skirt portion of the pistons. This, however, increases the dead volume of fluid that must be moved within the translating unit, and can have the effect of decreasing the efficiency of these units. Consequently, it is usual to refill the hollowed-out portion with a material of lighter weight than that of the piston, and which possesses a sufficiently high bulk modulus to resist compression under the high pressures encountered during operation. Such filler material must be positively retained within the piston in some manner, so that it will not be displaced during operation of the translating units, thereby potentially causing severe damage to such units.

Prior attempts have been made to provide light-weight-core pistons for use in these hydraulic translating units. However, the means employed to retain the filler in position within the pistons are frequently elaborate and expensive, or inadequate, leading to loosening or dislodging of the core during operation of the piston, and often both disadvantages are present. Also, although prior core designs have usually resulted in a lighter-weight-piston, the ensuing reduced piston strength has occasionally caused the piston to succumb to the high stresses developed during operation.

SUMMARY AND OBJECTS OF THE INVENTION

The new and improved core retaining means of this invention provides a relatively simple and economical method of retaining a light-weight-core of filler material, of novel design, within a hollowed-out skirt portion of a piston, while increasing piston strength.

Accordingly, it is an object of this invention to provide an efficient and inexpensive means of retaining a core of filler material within the hollowed-out skirt portion of a piston used in piston-type hydraulic translating units.

Another object of the invention is to provide an improved design for a core of filler material, resulting in a light-weight piston having improved capacity to withstand stress, because of having greater strength in the area where the stress forces are concentrated.

BRIEF DESCRIPTION OF THE DRAWINGS

Other objects of this invention will become apparent from the following description and accompanying drawings, wherein.

DETAILED DESCRIPTION OF THE INVENTION

Figure 1:
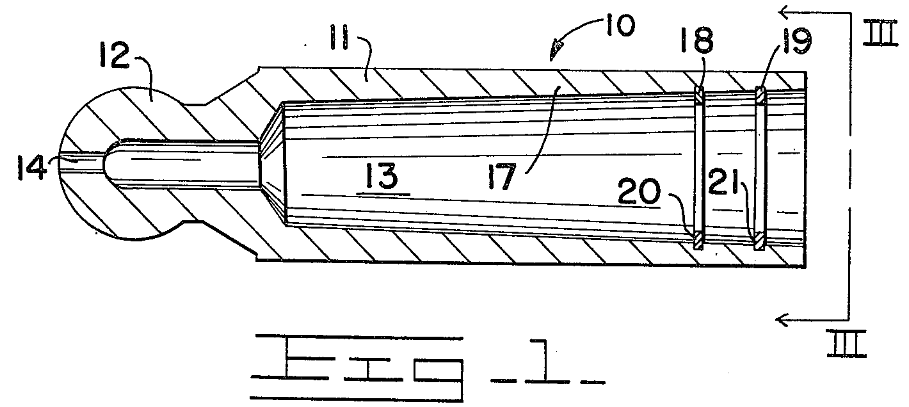
FIG. 1 is a longitudinal cross-sectional view of a piston for a hydraulic pump or motor embodying one means for retention of the core filler material and illustrating a means to provide a maximum reduction weight of the piston by boring out the piston skirt on a taper.
Figure 2:
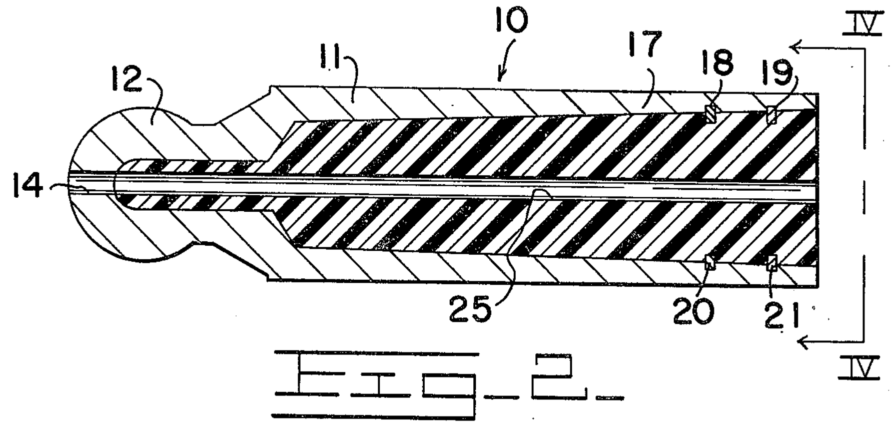
FIG. 2 is a longitudinal cross-sectional view of the piston of FIG. 1, with the generally conically-shaped core filler material in place.
Figure 3:
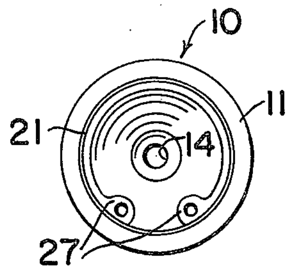
FIG. 3 is an end view of the unfilled piston taken along the line III—III of FIG. 1.

FIGS. 1, 2, 3, 4, and 5 illustrate pistons useful in piston-type hydraulic translating units. With particular reference to FIGS. 1 and 3, the piston 10 is made up of a hollow shirt portion 11 and a spherical base portion 12, which cooperates with a conventional piston shoe (not shown). The base portion 12 is provided with a drilled passage 14 which communicates with the tapered bore or cavity 13, thereby creating a channel for the introduction of lubricant between the ball section 12 and its cooperating piston shoe. The skirt wall 17, defining cavity 13, is tapered so that the thickness of wall 17 is greater near the base portion 12, thereby providing greater strength in the area where the stress forces are concentrated. The wall 17 is thinner near the opposite open end of piston 10.

This piston configuration provides greater strength than pistons having cavities with walls of uniform thickness; yet such tapered wall pistons remain lightweight.

Figure 5:
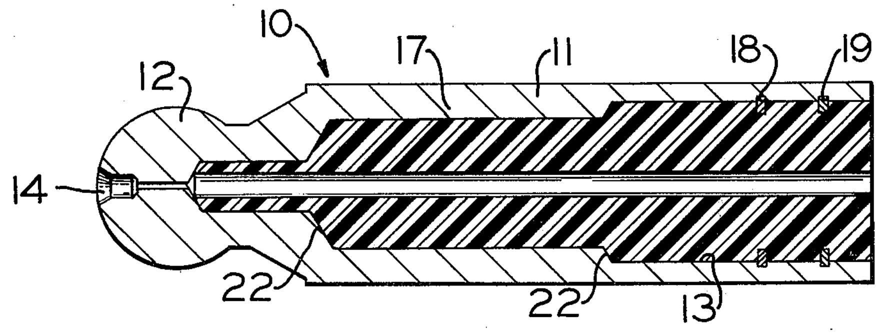
FIG. 5 is a cross-sectional longitudinal view of a modified form of a piston wherein the piston is provided with a straight stepped bore.

As illustrated in FIG. 5, the piston cavity may also be manufactured in a modified form wherein the walls form stepped cylinders rather than the tapered wall of FIGS. 1 and 2. In this modified version, the skirt wall 17, defining cavity 13 is stepped so that the thickness of wall 17 is greater near base porion 12, thereby providing greater strength in the area where the stress forces are concentrated. Stepped transition walls 22 may be perpendicular to skirt wall 17, however from a stress standpoint, walls 22 are preferably sloped or at angles to wall 17 as illustrated.

In the improved means for retaining filler material introduced into cavity 13 against axial displacement within piston 10, skirt wall 17 is provided with axially spaced circumferentially formed grooves 18 and 19. These grooves may either define a plane, which is perpendicular to the outer wall of piston 10, or which is at a slight angle thereto, if desired.

Two conventional snap rings 20 and 21, are resiliently mounted in grooves 18 and 19, and, as best seen in FIG. 3, extend beyond these grooves into cavity 13, to provide transverse surface areas to engage the filler material. Suitable snap rings for purposes of this invention, such as those illustrated in FIG. 3, are commercially available. Alternatively, snap rings of varying configurations resiliently fitting into grooves formed on the inner surface of the skirt wall may be substituted, as long as a sufficient portion of these rings extends into the piston cavity 13 to provide a transverse surface area to interlock with the filler material.

Preferably, the snap rings have individual protrusions 27 extending beyond the inner periphery of the ring, as indicated in FIG. 3, to further increase the ring surface area available to engage the filler material. It is envisioned that provision of two snap rings will, in most instances, suffice to retain the filler material against axial displacement within the piston during operation thereof; however, in some instances, for example, where the filler material is not subject to undue force, one snap ring may suffice. In other instances, more than two snap rings may be desirable. The snap rings have sufficient resiliency to tightly fit within grooves 18 and 19, thereby reducing the potential for rotation of the filler cone within the piston, due to the frictional engagement of the snap rings with the grooves.

Figure 4:
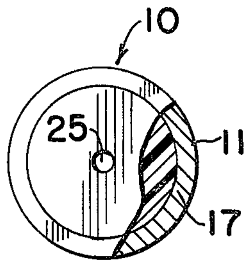
FIG. 4 is an end view of the filled piston, taken along the line IV—IV of FIG. 2.

FIGS. 2, 4, and 5 illustrate piston 10 with bore 13 filled with a lightweight filler material, positively mechanically interlocked with snap rings 20 and 21. Any suitable lightweight filler material may be used to fill cavity 13 - for example, a thermosetting phenolic resin, such as Durez No. 18975 or No. 23639, available from the Durez Plastics Division, Hooker Chemical Corporation, 500 Walck Road, North Tonawanda, New York. This material is of sufficient strength to resist compression under the high pressures of the translating unit, although any other lightweight material, such as metal, epoxy, resin, etc., having a sufficiently high bulk modulus to resist compression under high pressure may be used.

Prior to filling cavity 13, snap rings 20 and 21 are fitted into grooves 18 and 19. The phenolic resin filler material is then ordinarily compression-molded into the cavity of the piston to eliminate any voids and to insure a positive mechanical interlock with the extended surfaces of the snap rings when the filler material hardens. Alternatively, transfer molding, pouring, or injection molding may be employed to introduce the filler material into the cavity, observing the same precautions as to voids and interlocking as with compression molding.

Depending on the filler material used, it may be found necessary to increase the surface area of the snap rings extending into the piston cavity 13 to compensate for undue contraction of the filler material as it solidifies. Increased ring radial thickness insures the positive interlock of the filler core with the snap rings 20 and 21, and prevents subsequent axial displacement of the filler material during operation of the piston. Differences in thermal expansion of the filler material and the piston material must also be considered when selecting appropriate snap rings to avoid creating a gap between the skirt wall 17 and the filler core, sufficient to dislodge the snap rings from the filler core on the grooves.

Also shown in FIGS. 2, 4, and 5, is a passage 25, communicating with passage 14, to complete the channel for the flow of lubricant through piston unit 10, as previously discussed. Preferably, passage 25 is formed by placing a long rod extending the length of the piston unit, into passage 14, prior to filling cavity 13, such as disclosed in our co-pending application of Hein et al Ser. No. 115,639, filed Feb. 16, 1971, having the same assignee as the present invention. The filler is then molded around the rod in the cavity, leaving a passage when the rod is removed after the filler has hardened. Alternatively, the passage may be drilled through the filler material after it has hardened.

What is claimed is:

1. A piston of the type used in hydraulic translating units, said piston including a base portion for engaging said piston to said unit, and a trailing skirt portion, said skirt portion having a cavity therein defined by an inner wall, said wall having a thickened cross-section adjacent the base portion to define a first cylindrical volume of said cavity, said wall having a reduced cross-section adjacent the end of said trailing portion to define a second cylindrical volume of said cavity, whereby the diameter of said first cylinder is less than the diameter of said second cylinder, said wall defining a transition wall portion interconnecting the thickened cross-section and reduced cross-section, said transition wall portion being sloped at an angle relative to said wall, said wall of said second cylinder two axially spaced inner annular grooves, and further comprising a core of molded plastic filler material substantially filling said cavity, and means for retaining said filler material in said cavity comprising two resilient snap rings means engaged within said grooves respectively and extending into two mating annular grooves defined by the core of filler material, the inner periphery of the ring being in continuous annular contact with the base of the groove defined by said core of filler material to positively interlock said inner wall of said piston and said core of filler material.

* * * * *

UNITED STATES PATENT AND TRADEMARK OFFICE

CERTIFICATE OF CORRECTION

PATENT NO. : 3,999,468

DATED : December 28, 1976

INVENTOR(S) : Gavin C. Bristow
Clarence D. Husson, Jr.

It is certified that error appears in the above-identified patent and that said Letters Patent are hereby corrected as shown below:

Col. 4, line 31, insert --defining-- after "cylinder" and before "two".

Signed and Sealed this

*Thirteenth* Day of *September 1977*

[SEAL]

*Attest:*

RUTH C. MASON
*Attesting Officer*

LUTRELLE F. PARKER
*Acting Commissioner of Patents and Trademarks*